United States Patent [19]

Kochanowski et al.

[11] 4,104,242

[45] Aug. 1, 1978

[54] REINFORCED THERMOPLASTIC POLYESTER COMPOSITIONS HAVING IMPROVED HIGH VOLTAGE BREAKDOWN RESISTANCE

[75] Inventors: John Edward Kochanowski, Stockbridge, Mass.; Allen Dale Wambach, Evansville, Ind.

[73] Assignee: General Electric Company, Pittsfield, Mass.

[21] Appl. No.: 751,186

[22] Filed: Dec. 16, 1976

[51] Int. Cl.$^2$ ............................................... C08K 5/25
[52] U.S. Cl. ........................... 260/40 R; 260/45.9 NC
[58] Field of Search ...................... 260/40 R, 45.9 NC

[56] References Cited

U.S. PATENT DOCUMENTS

| T858,009 | 1/1969 | Tholstrup et al. | 260/45.9 NC |
|---|---|---|---|
| 2,808,416 | 10/1957 | Bell et al. | 260/45.9 NC |
| 3,538,046 | 11/1970 | Oertel et al. | 260/45.9 NC |
| 3,660,438 | 5/1972 | Dexter | 260/404.5 |
| 3,814,725 | 6/1974 | Zimmerman et al. | 260/40 R |
| 3,870,680 | 3/1975 | Schurdak | 260/45.9 NC |

*Primary Examiner*—Sandra M. Person
*Attorney, Agent, or Firm*—William F. Mufatti; Edward A. Hedman; Rocco S. Barrese

[57] ABSTRACT

Reinforced thermoplastic compositions are provided comprising a high molecular weight linear polyester, such as poly(1,4-butylene terephthalate) in combination with a reinforcing agent and a minor proportion of an alkylhydroxyphenylalkanoyl-hydrazine, such as N,N'-bis(3,5-di-tert-butyl-4-hydroxy-hydrocinnamoyl)-hydrazine. The use of the alkylhydroxyphenylalkanoyl-hydrazine retains the inherent resistance to high voltage breakdown of the polyester resin component while not affecting the other properties of the composition, such as strength, modulus, shrinkage, etc.

17 Claims, No Drawings

REINFORCED THERMOPLASTIC POLYESTER COMPOSITIONS HAVING IMPROVED HIGH VOLTAGE BREAKDOWN RESISTANCE

This invention relates to reinforced thermoplastic polyester compositions having improved high voltage breakdown resistance. More particularly, it pertains to compositions comprising a linear high molecular weight polyester, a reinforcement and an alkylhydroxyphenylalkanoylhydrazine. The reinforced compositions retain the resistance to high voltage breakdown of the polyester component, without impairing the strength, modulus heat deflection temperature, impact properties, etc., sought by adding a reinforcement.

BACKGROUND OF THE INVENTION

High molecular weight linear polyesters and copolymers of glycols and terephthalic or isophthalic acid have been available for a number of years. These are described inter alia in Whinfield et al, U.S. Pat. No. 2,465,319 and in Pengilly, U.S. Pat. No. 3,047,539. These patents disclose that the polyesters are particularly advantageous as film and fiber-formers.

With the development of molecular weight control, use of nucleating agents and two-step molding cycles, poly(ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

A useful family of such compositions are those which are reinforced, e.g., with from about 1 to about 60% of a reinforcing agent, e.g., talc, mica, clay, preferably filamentous glass, based on the weight of reinforcing agent and polyester component.

However, there is a need to improve high voltage dielectric breakdown resistance. For example, addition of 30% by weight of glass filaments to poly(1,4-butylene terephthalate) and molding the composition into rotors for automotive ignition system distributors, provides test pieces which show a 50% failure rate in 100 hours when tested continuously at 30,000 volts. Since peak voltages in automobile distributors range from about 25,000 to 50,000, the breakdowns sometimes are noticed after only 35,000 to 50,000 miles of driving.

It has now been discovered that the use of a small amount of an alkylhydroxyphenylalkanoyl-hydrazine measurably improves the long term high voltage dielectric breakdown resistance of such reinforced polyester resins. As an illustration, a poly(1,4-butylene terephthalate) composition containing 0.25% by weight of N,N'-bis(3,5-di-tert-butyl-4-hydroxy-hydrocinnamoyl) hydrazine and 30% by weight of glass fibers was found to have three times the expected life in comparison with a 30% glass reinforced poly(1,4-butylene terephthalate) which did not contain the N,N'-bis(3,5-di-tert-butyl-4-hydroxy-hydrocinnamoyl) hydrazine. Tests conducted on molded rotors at 30,000 volts, continuously, showed that the alkylhydroxyphenylalkanoyl-hydrazine containing composition had a 50% failure rate at 200 hours, whereas the 50% failure rate was only 100 hours with the aforementioned composition which did not contain the alkylhydroxyphenylalkanoyl-hydrazine.

DESCRIPTION OF THE INVENTION

According to this invention, there are provided reinforced thermoplastic compositions, with enhanced dielectric resistance, for molding, e.g., injection molding, compression molding, transfer molding, and the like, comprising:

(a) a high molecular weight linear polyester resin;
(b) a reinforcing amount of a reinforcing agent; and
(c) a minor amount of an alkylhydroxyphenylalkanoylhydrazine having the general formula:

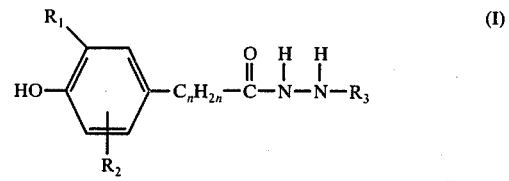

(I)

wherein $R_1$ is a lower alkyl group containing from 1 to 6 carbon atoms, $R_2$ is hydrogen or a lower alkyl group containing from 1 to 6 carbon atoms, and $R_3$ is hydrogen, an alkanoyl group containing 2 to 18 carbon atoms or a group represented by the formula

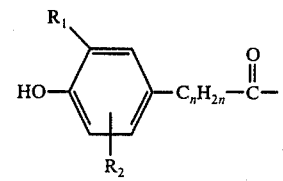

and $n$ is a number from 0 to 5.

When used herein, the expression "long term voltage breakdown resistance" refers in general to dielectric strength and in practical terms to resistance to loss in insulation resistance against intermittent peak voltages in the range of 25,000 to 50,000 volts for a long time, of the order of 3 to 6 years. A standard measure of resistance, for selection purposes can, however, comprise tests on molded pieces, such as dielectric strength tests as outlined in ASTM D149-64, and the like.

The high molecular weight normally flammable linear polyesters used in the present compositions are polymeric glycol esters of terephthalic acid and isophthalic acids. They are available commercially or can be prepared by known techniques such as by the alcoholysis of esters of the phthalic acid with a glycol and subsequent polymerization, by heating glycols with the free acids or with halide derivatives thereof, and similar processes. These are described in U.S. Pat. No. 2,465,319 and U.S. Pat. No. 3,047,539, and elsewhere.

Although the glycol portion of the polyester can contain from two to ten carbon atoms, it is preferred that it contain from two to four carbon atoms in the form of linear methylene chains.

Preferred polyesters will be of the family consisting of high molecular weight, polymeric glycol terephthalates or isophthalates having repeating units of the general formula:

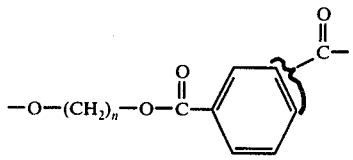

wherein n is a whole number of from two to four, and mixtures of such esters, including copolyesters of terephthalic and isophthalic acids of up to about 30 mole % isophthalic units.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, high molecular weight polyesters will have an intrinsic viscosity of at least about 0.4 deciliters/gram and preferably, at least 0.7 deciliters/gram as measured in a 60:40 phenol/tetrachloroethane mixture at 30° C. At intrinsic viscosities of at least about 0.7 deciliters/gram, there is a further enhancement in toughness of the present compositions.

The reinforcing agent (b), such as mica, talc, clay and preferably glass fiber reinforcement, is used herein in amounts ranging from about 1 to about 60%, preferably from about 10 to about 40%, by weight, of the combined weight of the reinforcement and polyester resin.

The alkylhydroxyphenylalkanoyl-hydrazines used herein and identified by Formula I above are described in U.S. Pat. No. 3,660,438, incorporated herein by reference. Particularly illustrative of the $R_1$ and $R_2$ lower alkyl groups that are substituted on the phenyl moiety in Formula I are methyl, ethyl, propyl, isopropyl, butyl, t-butyl, pentyl, hexyl, and the like. The preferred groups are the tertiary alkyls. Illustrative examples of the higher alkyl groups are heptyl, octyl, decyl, dodecyl, tetradecyl, hexadecyl, octadecyl, and the like, both straight chain and branched chain. A particularly preferred alkylhydroxyphenylalkanoyl-hydrazine within Formula I for the purposes of this invention is N,N'-(3,5-di-tert-butyl-4-hydroxyhydrocinnamoyl) hydrazine.

The amount of alkylhydroxyphenylalkanoyl-hydrazine used for the purposes of this invention includes those minor amounts which are sufficient to improve the dielectric resistance of the polyester composition but insufficient to measurably adversely affect the other desirable physical properties of the composition. More specifically, these amounts range from about 0.05 to about 2.0%, preferably from about 0.25% to about 1.0%, by weight, of the polyester resin component.

The compositions of this invention can be prepared by a number of procedures. In one way the reinforcement, e.g., glass fibers, and the alkylhydroxyphenylalkanoyl-hydrazine is put into an extrusion compounder with the polyester resin to produce molding pellets. The reinforcing agent and alkylhydroxyphenylalkanoyl-hydrazine are dispersed in a matrix of the polyester resin in the process. In another procedure, the reinforcing agent and alkylhydroxyphenylalkanoyl-hydrazine are mixed with the polyester resin by dry blending, then either fluxed on a mill and comminuted, or they are extruded and chopped. The reinforcing agent and alkylhydroxyphenylalkanoyl-hydrazine can also be mixed with the powdered or granular polyester and directly molded, e.g., by injection or transfer molding techniques.

It is always important to thoroughly free all of the ingredients: resin, reinforcement, alkylhydroxyphenylalkanoyl-hydrazine and any optional, conventional additives from as much water as possible.

In addition, compounding should be carried out to ensure that the residence time in the machine is short; the temperature is carefully controlled; the friction heat is utilized; and an intimate blend between the resin, the alkyl hydroxyphenylalkanoyl-hydrazine and the reinforcement is obtained.

Although it is not essential, best results are obtained if the ingredients are pre-compounded, pelletized and then molded. Pre-compounding can be carried out in conventional equipment. For example, after carefully pre-drying the polyester resin, the alkylhydroxyphenylalkanoyl-hydrazine and the reinforcing agent, e.g., under vacuum at 100° C, for 12 hours, a single screw extruder is fed with a dry blend of the ingredients, the screw employed having a long transition section to ensure proper melting. On the other hand, a twin screw extrusion machine, e.g., a 28 mm Werner Pfleiderer machine can be fed with resin and additives at the feed port and reinforcement down stream. In either case, a generally suitable machine temperature will be about 450° to 460° F.

The pre-compounded composition can be extruded and cut up into molding compounds such as conventional granules, pellets, etc., by standard techniques.

The compositions can be molded in any equipment conventionally used for reinforced thermoplastic compositions. For example, with poly(1,4-butylene terephthalate), good results will be obtained in an injection molding machine, e.g., of the Newbury type with conventional cylinder temperatures, e.g., 450° F. and conventional mold temperatures, e.g., 150° F. On the other hand, with poly(ethylene terephthalate), because of the lack of uniformity of crystallization from interior to exterior of thick pieces, somewhat less conventional but still well-known techniques can be used. For example, a nucleating agent such as graphite or a metal oxide, e.g., ZnO or MgO can be included and standard mold temperature of at least 230° F will be used.

DESCRIPTION OF THE PREFERRED EMBODIMENTS

The following samples illustrate the invention. They are set forth as a further description but are not to be construed as limiting the invention thereto.

EXAMPLE 1

Dry blends of poly(1,4-butylene terephthalate), intrinsic viscosity, 0.8 dl./g., N,N'-bis(3,5-di-tert-butyl-4-hydroxyhydrocinnamoyl)-hydrazine (Ciba-Geigy Corporation, Irganox MD-1024), and ⅛ inch fibrous glass reinforcement and small amounts of stabilizers (Irganox 1093, i.e., tetrakis(3-(3', 5'-di-t-butyl-4'-hydroxyphenyl) propionyloxymethyl) methane and Ferro 904, i.e., diphenyl decyl phosphite), are compounded and extruded at 450°–460° F in an extruder. For comparison purposes, blends of the polyester and ⅛ inch fibrous glass reinforcement are compounded and extruded. The extrudate is pelletized and injection molded in a 5 oz. Van Dorn machine at 525° F (mold temperature — 150° F). The compositions are also molded into rotors for automotive ignition systems, to serve as test pieces. The formulations used and the physical and electrical properties obtained are summarized in the Table.

TABLE

| | Physical properties of compositions of poly(1,4-butylene terephthalate) and an alkylhydroxyphenylalkanoyl-hydrazine | |
|---|---|---|
| Example | 1 | 1A* |
| Ingredients (parts by weight) | | |
| poly(1,4-butylene terephthalate) | 69.25 | 69.25 |
| N,N'-bis(3,5-di-tert-butyl-4-hydroxyhydrocinnamoyl)hydrazine | 0.25 | — |
| fibrous glass reinforcement 1/8" | 30 | 30 |
| Properties | | |
| Specific gravity | 1.534 | 1.53 |
| Notched Izod impact, ft.lbs./in. | 1.79 | 1.7 |
| Tensile Strength, psi | 17,270 | 17,000 |
| Flexural modulus, psi | 1,160,000 | 1,000,000 |
| Heat Deflection Temp., ° F | | |
| 264 psi | 406 | 400 |
| T50% failure at 30,000 volts, hrs.** | 200 | 100 |

*Control, typical properties
**Molded into distributor rotors and tested for breakdown; time for 50% of the rotors to fail.

The above results clearly demonstrate that N,N'-bis(3,5-di-tert-butyl-4-hydroxy-hydrocinnamoyl)-hydrazine improves the dielectric strength of a glass reinforced poly(1,4-butylene terephthalate) composition without materially adversely affecting the other desirable physical properties of the composition.

Obviously, other modifications are possible in view of the above examples. For instance, if the procedure of Example 1 is repeated, substituting for the poly(1,4-butylene terephthalate) the following high molecular weight linear polyesters:

a poly(ethylene terephthalate) having an intrinsic viscosity of about 0.9;

a 60/40 ethylene terephthalate-ethylene isophthalate copolyester having an intrinsic viscosity of about 0.9; or a poly(1,3-propylene terephthalate) prepared from trimethylene glycol and methyl terephthalate and having an intrinsic viscosity of about 1.0, improved reinforced polyester compositions according to this invention will be obtained.

Substituting either talc, mica or clay for the glass reinforcing agent of Example 1 will also give the improved reinforced polyester compositions contemplated by this invention.

Also, if the procedure of Example 1 is repeated substituting N-stearyl-N'-[β-(3,5-di-tert-butyl-4-hydroxyphenyl)-propionyl]-hydrazine for the N,N'-bis(3,5-di-tert-butyl-4-hydroxyhydrocinnamoyl)-hydrazine, improved reinforced polyester compositions according to this invention will also be obtained.

Because of their excellent physical, mechanical, chemical, electrical and thermal properties, the resin composites of this invention have many and varied uses. The molding powder formulations may be used alone or mixed with other polymers, as well as flame retardants, mold release agents, non-dripping agents, pigments and dyes, stabilizers, plasticizers, and the like.

Obviously, other modifications and variations of the present invention are possible in the light of the above teachings. It is therefore to be understood that changes may be made in the particular embodiments of the invention described which are within the full intended scope of the invention as defined by the appended claims.

We claim:

1. A reinforced thermoplastic composition having improved dielectric resistance comprising:

(a) a high molecular weight linear polyester resin;
(b) a reinforcing amount of a reinforcing agent; and
(c) a minor amount of an alkylhydroxyphenylalkanoyl-hydrazine.

2. A composition as defined in claim 1 wherein said reinforcing agent (b) is selected from the group consisting of glass fibers, talc, mica and clay.

3. A composition as defined in claim 1 wherein the reinforcing agent (b) is glass fibers.

4. A composition as defined in claim 1 wherein the alkylhydroxyphenylalkanoyl-hydrazine is represented by the formula:

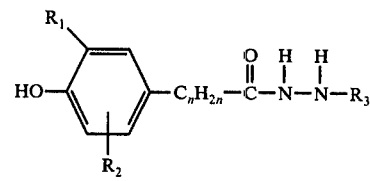

wherein $R_1$ is a lower alkyl group containing from 1 to 6 carbon atoms, $R_2$ is selected from the group consisting of hydrogen and lower alkyl containing from 1 to 6 carbon atoms, $R_3$ is selected from the group consisting of hydrogen, alkanoyl containing from 2 to 18 carbon atoms and a group represented by the formula:

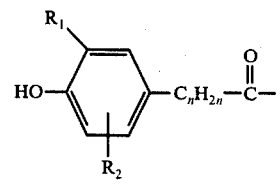

wherein $R_1$ and $R_2$ are as defined above, and $n$ is a number from 0 to 5.

5. A composition as defined in claim 4 wherein the alkylhydroxyphenylalkanoyl-hydrazine is N,N'-bis(3,5-di-tert-butyl-4-hydroxyhydrocinnamoyl)-hydrazine.

6. A composition as defined in claim 5 wherein the reinforcing agent (b) is glass fibers.

7. A composition as defined in claim 1 wherein the reinforcing agent (b) comprises from about 1 to about 60% by weight based on the combined weight of the reinforcing agent (b) and polyester resin (a) and the alkylhydroxyphenylalkanoyl-hydrazine comprises from about 0.05 to about 2 percent by weight of the polyester resin (a).

8. A composition as defined in claim 7 wherein the reinforcing agent comprises from about 10 to about 40% by weight, based on the combined weight of the glass and polyester resin (a), and the alkylhydroxyphenylalkanoyl-hydrazine comprises from about 0.15% to about 1.0% by weight of the polyester resin (a).

9. A composition as defined in claim 1 wherein said polyester has an intrinsic viscosity of at least about 0.4 deciliters per gram when measured in a solution in a 60:40 mixture of phenol and trichloroethane at 30° C.

10. A composition as defined in claim 7 wherein the reinforcing agent (b) is glass fibers.

11. A composition as defined in claim 8 wherein the reinforcing agent (b) is glass fibers.

12. A composition as defined in claim 8 wherein said polyester has an intrinsic viscosity of at least about 0.7 deciliters per gram when measured in a solution in a 60:40 mixture of phenol and trichloroethane at 30° C.

13. A composition as defined in claim 1 wherein said polyester is selected from the group consisting of polymeric glycol terephthalate and isophthalate esters having repeating units of the formula:

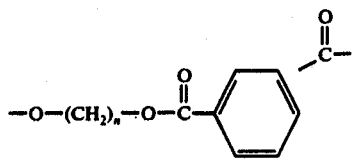

wherein $n$ is a whole number of from two to four, and mixtures of such esters.

14. A composition as defined in claim 10 wherein the alkylhydroxyphenylalkanoyl-hydrazine is N,N'-bis(3,5-di-tert-butyl-4-hydroxyhydrocinnamoyl)-hydrazine.

15. A composition as defined in claim 11 wherein the alkylhydroxyphenylalkanoyl-hydrazine is N,N'-bis(3,5-di-tert-butyl-4-hydroxy-hydrocinnamoyl-hydrazine.

16. A composition as defined in claim 12 wherein said polyester is poly(1,4-butylene terephthalate).

17. A composition as defined in claim 13 wherein said polyester is poly(1,4-butylene terephthalate).

* * * * *

UNITED STATES PATENT OFFICE
CERTIFICATE OF CORRECTION

Patent No. 4,104,242　　　　　　　　Dated August 1, 1978

Inventor(s) John Edward Kochanowski and Allen Dale Wambach

It is certified that error appears in the above-identified patent and that said Letters Patent are hereby corrected as shown below:

In the Specification:

Column 3, line 44, after "N,N'-", insert --bis--

Signed and Sealed this

Third Day of April 1979

[SEAL]

Attest:

RUTH C. MASON
Attesting Officer

DONALD W. BANNER
Commissioner of Patents and Trademarks